Figure 1:
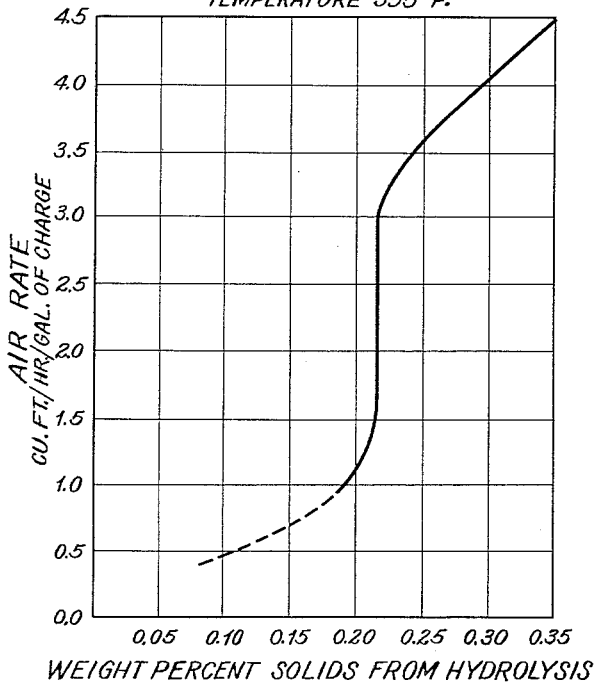

Oct. 18, 1955    F. I. L. LAWRENCE ET AL    2,721,180
ORGANO-BORON COMPOSITIONS AND METHOD FOR PRODUCTION THEREOF
Filed Oct. 9, 1952

INVENTORS
Franklin I. L. Lawrence,
Robert K. Smith and
Michael J. Pohorilla
BY Burns, Deane and Benedict
ATTORNEYS United States Patent Office 2,721,180
Patented Oct. 18, 1955

2,721,180

ORGANO-BORON COMPOSITIONS AND METHOD FOR PRODUCTION THEREOF

Franklin I. L. Lawrence, Robert K. Smith, and Michael J. Pohorilla, Bradford, Pa., assignors to Kendall Refining Company, Bradford, Pa., a corporation of Pennsylvania Application October 9, 1952, Serial No. 313,851

20 Claims. (Cl. 252—49.6)

This invention relates to organo-boron compositions and to a method for the production thereof. More particularly, the invention relates to stable, oil-soluble, organo-boron compositions which may be utilized as additives for lubricants and fuels; to lubricants and fuels containing such organo-boron compositions; and to methods for the production thereof.

In general, organo-boron compounds known in the prior art demonstrate such instability as to preclude commercial acceptance as lubricant additives. Conventional borate esters, in particular, are known to be rapidly hydrolyzed to precipitate substantial quantities of boric acid, and hence are considered infeasible for use in substantial quantities as additives for lubricants.

It is a primary object of this invention to provide a method for producing from conventional paraffinic petroleum fractions, novel organo-boron compositions.

It is a further primary object of the invention to provide novel organo-boron compositions which demonstrate unusual stability when blended with hydrocarbon oil compositions.

It is an additional object of the invention to provide organo-boron compositions of a new type which are stable when blended with synthetic lubricating compositions, including the polyalkylene glycols such as the polypropylene glycols, polybasic acid esters such as di-2-ethylhexyl sebacate, and the like.

It is an additional object of the invention to provide novel organo-boron compositions which, when added to lubricating compositions of both the mineral oil and the synthetic type, will improve the oxidation or wear characteristics thereof.

It is a further object of the invention to provide lubricant compositions containing the novel organo-boron compositions of the invention.

It is still another object of the invention to provide novel organo-boron compositions which are useful as additives to improve the performance characteristics of gasoline, diesel fuels, and the like.

It is also an object of the invention to provide novel internal combustion engine fuels containing the organo-boron compositions of the invention.

It is an additional object of the invention to provide a method for enhancing the resistance of organo-boron compositions to decomposition by hydrolysis.

In accordance with this invention, it has been discovered that novel organo-boron compositions can be produced by passing a free-oxygen containing gas through a normally liquid paraffinic petroleum fraction having a boiling point in the range of about 350° F. to about 800° F., maintained at a temperature within the range of about 305° F. to about 385° F.; there being available for reaction in said fraction from about 1 to about 3 chemical equivalents of an acid selected from the group consisting of ortho-boric acid and meta-boric acid, per mole of paraffinic hydrocarbon; said gas being passed through said fraction at a rate requisite to provide not more than about 0.6 cubic feet of oxygen per hour per gallon of said fraction; to produce a crude reaction product containing at least about 0.2% by weight of chemically combined boron.

The above-defined process conditions are critical to the production of organo-boron compositions characterized by the properties required to achieve various of the aforementioned objects of this invention.

It is of paramount importance that an additive form no appreciable quantity of solids, i. e. by sedimentation or hydrolysis, when blended with a lubricant or fuel. The formation of such solids in substantial quantity has resulted in the nonacceptance by the industry of many previously known organic boron compositions as additives for lubricants and fuels.

To the end that organo-boron compositions which do not form an excessive quantity of solid materials by sedimentation or hydrolysis may be produced, it is critical to the process of this invention that not more than about 3 chemical equivalents of an acid selected from the group consisting of ortho-boric acid and meta-boric acid be available per mole of paraffinic hydrocarbon present in the course of the oxidation reaction.

It is further critical to the invention that the relative concentration of ortho- or meta-boric acid in the reaction mixture not fall below about 1 equivalent per mole of paraffinic hydrocarbon present in the starting material. The availability to the reaction of a relative quantity of ortho- or meta-boric acid substantially less than 1 equivalent per mole of paraffinic hydrocarbon present, results in the formation of a crude reaction mixture containing a quantity of chemically combined boron insufficient for the feasible production therefrom of an organo-boron composition having utility as a lubricant or fuel additive. It is critical to the process of this invention that the reaction mixture obtained therefrom contain at least about 0.2% by weight of chemically combined boron.

The interaction of hydrocarbon, oxygen, and boric acid in the process of this invention results in the formation of water. The quantity of water formed is a function of the rate of supply of oxygen to the reaction mixture. Under the conditions defined for the process of this invention, dynamic equilibria are established between the ortho-boric acid, meta-boric acid, forms of boric anhydride less hydrated than ortho- and meta-boric acid, and boric anhydride per se. Such equilibria may be generally indicated by the following equation:

$$B_2O_3 + 3H_2O \rightleftarrows 2HBO_2 + 2H_2O \rightleftarrows 2H_3BO_3$$

As ortho-boric acid and meta-boric acid are consumed by the reaction, the above equilibria are displaced to the right, and additional quantities of ortho-boric acid or meta-boric acid are made available to the reaction. As the reaction proceeds, all of the boric acid forming materials present in the reaction mixture may ultimately be converted to the ortho- or meta-borate form essential to the process.

It is apparent that the quantity of ortho-boric acid or meta-boric acid available for reaction at any time during the process is a function of the quantity of water present in the reaction mixture, and hence dependent upon the rate of supply of oxygen to the reaction mixture.

To maintain an adequate concentration in the reaction mixture, of ortho- or meta-boric acid available for reaction, it is critical that oxygen be supplied to the reaction mixture at a rate not substantially greater than about 0.6 cubic feet of oxygen per hour per gallon of the paraffinic petroleum fraction employed as a starting material.

If oxygen is supplied at a rate substantially greater than the specified critical maximum of 0.6 cubic feet per hour per gallon of paraffinic petroleum fraction employed as a starting material, water is removed from the reaction mixture and the aforementioned equilibria displaced far to the left. Under such conditions a product is formed which is characterized by excessive sedimentation and hydrolysis when blended with lubricating compositions such as hydrocarbon oils and synthetic lubricants and with fuels. Such compositions are not contemplated by this invention.

Preferably oxygen is supplied to the reaction mixture at a rate of from about 0.3 to about 0.5 cubic feet per hour per gallon of paraffinic petroleum fraction utilized as a starting material. The corresponding air rate is a critical maximum of about 3.0 cubic feet per hour per gallon of petroleum fraction utilized as a starting material. Likewise the preferred range of rate of supply of air is from about 1.5 to about 2.5 cubic feet per hour per gallon of petroleum fraction starting material.

Figure 2:
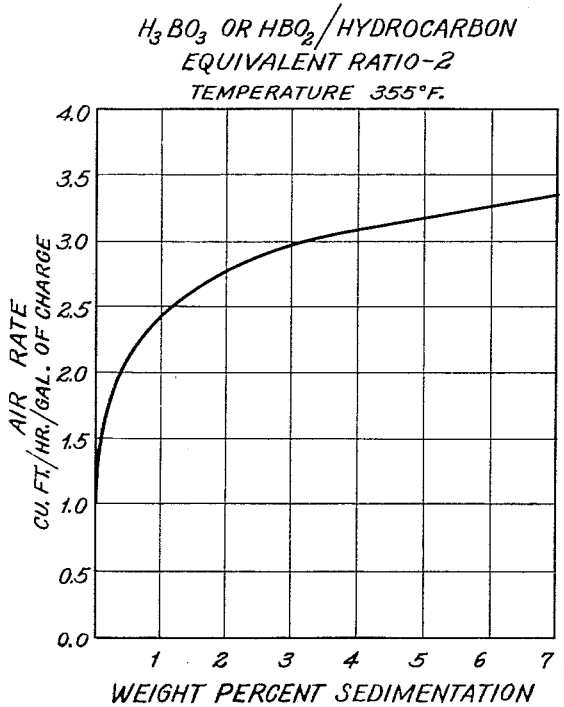

The criticality of the upper limit of the rate of supply of free-oxygen of about 0.6 cubic feet of oxygen per hour per gallon of petroleum fraction starting material is evidenced by Figures 1 and 2. In Fig. 1, there is graphically represented the relationship between the rate of supply of free-oxygen in the form of air to the reaction mixture, and the quantity of solids formed by hydrolysis, in a No. 1100 grade aviation oil blended with 30% by volume of organo-boron compositions. The No. 1100 grade aviation oil was a blend of phenol extracted materials and bright stock (obtained from Pennsylvania) and meeting Federal Specification MIL-L-6082A.

The organo-boron compositions employed in the oil blends were "crude" organo-boron compositions obtained from the reaction mixtures in which they were formed by distillation of the lower boiling components of the filtered reaction product to a temperature of about 300° F. at an average pressure of about 2 mm. of mercury.

The degree of hydrolysis was determined by exposing 100 milliliter samples of the aforementioned blends to the atmosphere for twenty-eight days under proper precautions to exclude the introduction of foreign materials. At the termination of the twenty-eight day test period, the oil blend samples were filtered through sintered glass fibers of medium porosity and the residua so obtained were washed with 150 cc. of naphtha to remove occluded oil. The residua were then dried and weighed and the degree of hydrolysis as weight percent of the original oil blends was calculated.

It will be observed from an examination of Fig. 1 that the character of the product obtained changes rapidly as the rate of supply of air exceeds substantially the critical upper limit of about 3.0 cubic feet per hour per gallon of petroleum fraction starting material. The products formed at rates of air supply appreciably in excess of about 3.0 cubic feet per hour per gallon of petroleum fraction starting material demonstrate progressively increasing and substantially greater hydrolysis than the products formed by the method of this invention. Such hydrolytically unstable products are therefore not suitable as additives for lubricating oils, and are not contemplated by this invention.

In Fig. 2 there is graphically represented the relationship between the volume percent of sedimentation formed in blends of No. 1100 aviation oil containing about 15% by volume of the "crude" organo-boron compositions of the type described with reference to Fig. 1. It will be observed by reference to Fig. 2 that there are produced organo-boron compositions which demonstrate a progressively increasing and excessive degree of sedimentation when the rate of supply of air to the reaction mixture substantially exceeds the critical upper limit of about 3.0 cubic feet of oxygen per hour per gallon of paraffinic petroleum fraction starting material. Such compositions are not contemplated by this invention, and are not useful as lubricating oil or fuel additives.

The volume percent of sedimentation was determined by incorporating into A. S. T. M. cone-shaped calibrated centrifuge tubes (see specification A. S. T. M. B96-47T) No. 1100 aviation oil blends containing 15% by weight of "crude" organo-boron compositions of the type described with reference to Fig. 1. The blends in the tubes were heated, if necessary, at a temperature of about 130°–140° F., to effect complete solution of the organo-boron material in the oil, and thereafter permitted to stand, stoppered, at room temperature for a period of three days. At the expiration of the three-day period, the blended oil was centrifuged for two hours at 1500 revolutions per minute and the amount of sedimentation of insoluble material recorded. The centrifuging was repeated at several three-day intervals, until constant readings were obtained. From such readings the volume percent of sedimentation was determined.

The data reflected by Figs. 1 and 2 were all obtained from oxidation reactions conducted at a temperature of about 355° F. with reaction mixtures in which there were about 2 equivalents of ortho- or meta-boric acid available per mole of paraffinic hydrocarbon present. Analogous results are obtained as the relative concentration of ortho-boric acid or meta-boric acid, and the temperature, are varied within the limits required by this invention. Such variations in reaction conditions effect some shift in the specific location of the curves on the graphs.

The charge stock utilized in developing Figs. 1 and 2 was a white mineral oil having a C-16 to C-17 molecular weight range. This charge stock was characterized by a flash point of 275° F., a fire point of 300° F., a viscosity at 100° F. of 39.6 S. U. S., a viscosity at 210° F. of 31.0 S. U. S., a cloud point of 28° F., a distillation range of 523° F. to 703° F., and a density of 20° C. of 0.8014.

Figs. 1 and 2 demonstrate that the compositions produced in accordance with the method of this invention are characterized by properties which distinguish them in kind from compositions obtained by supplying oxygen to the reaction mixture at a rate substantially in excess of 0.6 cubic feet per hour per gallon of paraffinic petroleum fraction starting material.

Elemental analyses demonstrate that the products of the process of this invention are substantially lower in molecular weight and of different molecular structure than products obtained by supplying oxygen to the oxidation reaction mixture at a rate substantially in excess of the upper limit critical to this invention. These facts are evidenced by data recorded in Table I.

TABLE I

| Reaction Conditions: | | | |
|---|---|---|---|
| Air Rate, S. C. F. H./gal. oil | 4.50 | 2.25 | 2.25 |
| Boron: Hydrocarbon Mole Ratio | 0.33 | 0.33 | 0.33 |
| Temperature, ° F | 355 | 355 | 325 |
| Elemental Analysis: | | | |
| Percent Carbon | 72.53 | 75.15 | 74.99 |
| Percent Hydrogen | 11.55 | 12.03 | 12.02 |
| Percent Boron | 2.36 | 1.95 | 1.83 |
| Percent Oxygen (by difference) | 13.56 | 10.87 | 11.16 |
| Observed Molecular Weight | 691 | 612 | 530 |
| Percent Non-Boron Oxy-Compounds | 29.7 | | |

The data appearing in Table I indicate that predominant products of this invention may be represented by the formula:

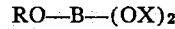

whereas the products resulting from the utilization of a substantially greater rate of supply of oxygen to the reaction mixture may be represented by the molecular structure:

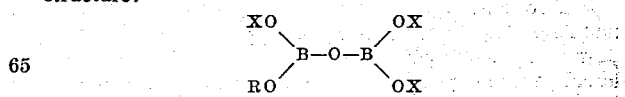

For both of the foregoing formulae the symbol "R" represents an alkyl group and "X" represents either a hydrogen atom or an alkyl group. The specific nature of the alkyl groups is dependent upon the starting materials and reaction conditions utilized. The products of this invention are, accordingly, most accurately defined by the process by which they are formed.

As a consequence of the aforementioned equilibria between the various boric acids and boric anhydrides, there may be employed at the initiation of the reaction boric anhydride or any of the various boric acids, including pyro-boric acid, meta-boric acid, and the like. Boric anhydride and the various boric acids differ only with respect to the degree of hydration. Consequently, as the reaction proceeds and water is formed, boric acids less hydrated than ortho- and meta-boric acid will be converted to the meta- and ortho- form.

Figure 3:
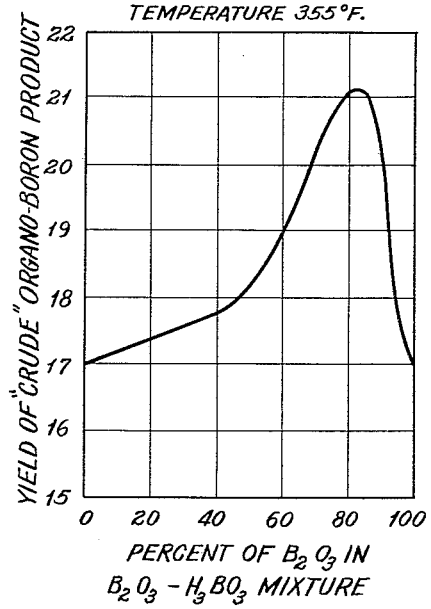

A preferred embodiment of the invention entails the utilization as a starting material of a mixture containing from about 50% to about 90% by weight of boric anhydride and about 50% to about 10% by weight of ortho- or meta-boric acid. Such a combination of boric anhydride and boric acid functions synergistically to substantially increase the yield of the desired organo-boron compositions, and therefore constitutes a salient feature of this invention. The advantage stemming from the use of a mixture of boric anhydride and ortho- or meta-boric acid, within the aforementioned range of relative proportions, is graphically represented by Fig. 3 which shows the relationship between the yield of organo-boron material and the relative percentage of ortho- or meta-boric acid and boric anhydride.

Significantly, it has been discovered that the boric acid residua resulting from the process of this invention normally constitutes a mixture of ortho- or meta-boric acid and boric anhydride in proportions falling within the above specified range. Generally such residua contain from about 70% to about 80% by weight of boric anhydride and about 20% to about 30% of boric acids. An important aspect of the invention therefore embraces the utilization as starting materials of such boric acid or boric anhydride residue for the formation of additional organo-boron compositions from fresh charges of paraffinic hydrocarbon starting material.

It is further critical that the process of this invention be effected at a temperature within the range of about 305° F. to about 385° F. If the lower temperature limit of about 305° F. is not observed the resulting reaction is long-delayed, due to an apparent induction period in which no organo-boron compounds are produced. The reaction mixture resulting from the practice of the invention at a temperature below the specified minimum of 305° F. furthermore contains substantially less than about 0.2% by weight of chemically combined boron and hence is entirely beyond the purview of this invention. It is critical to the process of this invention that there be obtained a crude reaction mixture containing at least about 0.2% by weight of chemically combined boron, to the end that a product may be obtained which is of value as a lubricant and fuel additive.

The upper temperature limit of about 385° F. is essential to obtain a practical yield of organo-boron materials, of the type with which this invention is concerned. At temperatures appreciably in excess of 385° F., significant quantities of such organo-boron composition are not obtained. The preferred temperature range is from about 340° F. to about 365° F.

Under the conditions specified for the process of this invention, the reaction requisite to form the desired organo-boron materials is normally completed in about five to about ten hours. It is essential that the reaction be not unduly extended for the reason that exhaustively oxidized mixtures yield organo-boron compositions which demonstrate excessive sedimentation and hydrolysis and which therefore are unsuitable as additives for lubricants and fuels. It has been determined that the rate of absorption of oxygen decreases markedly at approximately the same point in the reaction that the quality of the organo-boron composition begins to be adversely effected by excessive oxidation. The proper end-point of the reaction is therefore determinable by observation of the rate of absorption of oxygen to note the point at which such rate markedly decreases. When air is utilized as the source of oxygen, it has been determined that the reaction is advisedly interrupted when the oxygen in the exit gases approximates 5% by volume.

It has further been determined that the rate of absorption of boron decreases simultaneously with the rate of absorption of oxygen and is a further criterion of the proper end-point of the reaction. Therefore frequent observation of the boron content coupled with gas analyses requisite to determine the rate of oxygen absorption, permits termination of the reaction at the proper end-point.

Free-oxygen may be supplied to the reaction mixture either as the essentially pure elemental gas or in admixture with any desired inert gas. For obvious economic reasons, air preferably is employed. In some cases it has proved desirable to preheat the air or other source of free-oxygen prior to supplying the same to the reaction mixture in the process of this invention. Preheating of the air to a temperature of from about 160° F. to about 210° F. has proved beneficial.

The process of this invention is preferably carried out in a cylindrical vessel. It has been determined that in such vessels it is highly desirable that the reaction mixture conform to a liquid depth/area ratio of at least about 2, to the end that a maximum yield of the desired products may be obtained. In such cylindrical vessels it has been discovered that if the liquid depth/area ratio falls substantially below 2, the yield of the desired material decreases with great rapidity. The term "area" as herein employed refers to the cross-sectional area normal to the cylindrical axis.

Conventional oxidation catalysts are preferably employed in the process of the invention. Such catalysts includ manganese naphthenate, manganese stearate, copper, cobalt, and nickel naphthenates, and the like. If desired, the process of this invention can be practiced without a catalyst.

The starting materials useful in the production of the organo-boron compositions of this invention must be selected not only on the basis of the yield of organo-boron compositions produced, but also in view of the fact that there must be obtained an ultimate product which will not unduly increase the pour point of the lubricants or fuels to which the product may be added. In general, normally liquid mineral oil soluble paraffins having a boiling point in the range of about 350° F. to about 800° F. may be employed. Those skilled in the art will well appreciate that solid, wax type materials may be expected to yield solid products less desirable as lubricant or fuel additives. Preferably the starting materials utilized in the process of the invention embrace paraffinic petroleum fractions boiling from within the range of about 500° F. to about 600° F. If separation of the organo-boron materials is desired, it is further preferred that fractions having an over-all boiling point range of not more than about 100° F. be utilized to facilitate the recovery and purification of the organo-boron compounds suitable for blending in lubricants and fuels.

Essentially pure paraffins have been discovered to give the greatest yield of the desired products. To this end, it is desirable to remove substantially completely from the charge stocks such aromatics as may be present. Naphthenes and olefins are also desirably removed from the charge stock prior to utilization in the process of this invention. Recovered, unoxidized charge stock from previous runs, in accordance with the method of the invention, may be utilized as a starting material either per se or subsequent to a light earth or acid treatment. An ideal charging stock is one characterized by molecular weight sufficiently high that the crude reaction mixture will contain a sufficient yield of borates and have such volatility characteristics that no distillation thereof will be necessary prior to utilization of the reaction mixture as a lubricant. Such a crude product would be characterized by a viscosity in the light oil range and would not necessitate excessive concentration.

The most satisfactory charge stocks give rise to reaction mixtures in accordance with the process of this invention, which may per se be employed as lubricant or fuel additives. In most instances, however, "crude" organo-boron compositions useful as lubricant or fuel additives are obtained by simple distillation of the reaction mixtures produced by the process of the invention to remove the lower boiling components thereof. In general, distillation at a pressure of from about 0.3 mm. of mercury to about 100 mm. of mercury at a temperature of from about 200° F. to about 425° F. is adequate for this purpose. Such "crude" organo-boron compositions normally boil at a temperature above the boiling range of the charge stock utilized, and hence unreacted charge stock may be removed by the distillation process.

In some instances, it is desirable or preferable to hydrolyze the crude organo-boron compositions of the invention with water or aqueous alkali to produce alcohols. Generally speaking, such hydrolysis may be effected in conventional manner by subjecting the crude organo-boron compositions to the action of water or aqueous alkali at a temperature of from about 50° F. to about 300° F. for a period of from about 0.5 minute to about 120 minutes. The preferred aqueous alkalis are aqueous solutions of alkali and alkaline earth metal hydroxides, particularly sodium hydroxide in a concentration such that the pH falls within the range of from about 10 to about 14.

It may be desirable in some instances to purify by distillation, the alcohols obtained by hydrolysis and thereafter reesterify the purified alcohols with boric acid to produce "purified" boron compositions useful as fuel or lubricant additives. Conventional procedures for effecting esterification of alcohols with boric acid may be employed. It has been determined that such esterification may desirably be effected by treating the alcohols with boric acid or boric anhydride at a temperature of from about 50° F. to about 300° F. Normally esterification is complete in from about 0.5 minute to about 120 minutes.

It has been discovered that the presence of weakly basic inorganic compounds in small amounts in the reaction mixture of the process of this invention will result in the ultimate production of organo-boron compositions of improved sedimentation characteristics. Materials useful for this purpose, in general, are those which form saturated aqueous solutions characterized by a pH of between about 7 and about 10. Examples of compounds which may be so employed include aluminum hydroxide, borax and other alkali and alkaline earth metal borates, such as $NaH_2BO_3$, $NaOBO$, $Ca(OBO)_2$, $CaHBO_3$, $KH_2BO_3$, and the like.

In general, from about 0.1% to about 5.0% by weight of such materials, based on the quantity of paraffinic petroleum fraction utilized, can satisfactorily be employed.

Significantly, the hydrolytic stability of the organo-boron compositions of this invention may be enhanced by the incorporation therein of organic carbinol compounds (i. e. compounds derived from methanol, $CH_3OH$) and particularly high molecular weight aliphatic alcohols, polyalkylene glycols, and the like. In general, there may be employed organic hydroxy compounds having from about 2 to 100 carbon atoms which are soluble in the organo-boron compositions of this invention. In Table II there is recorded comparative data showing the effects of the incorporation of such organic hydroxy materials into aviation oil containing 30% by weight of the "crude" organo-boron compositions of this invention produced by the methods described with reference to Figs. 1 and 2.

TABLE II

*Effect of organic hydroxy compounds on hydrolytic stability of organo-boron compositions in 30% by volume concentration in 1100 grade aviation oil [1]*

| Hydroxy Compound | Volume Percent of Hydroxy Compound | Weight Percent Solids Formed by Hydrolysis [2] |
|---|---|---|
| None | 0 | 0.23 |
| Heptadecanol | 1.0 | 0.10 |
| Heptadecanol | 5.0 | 0.12 |
| Polyethylene Glycol, Mol. Wt. 200 | 1.0 | 0.09 |
| Polypropylene Glycol Compounds: | | |
|   Viscosity @ 210° F., 177 S. U. S.[3] | 1.0 | 0.05 |
|   Viscosity @ 210° F., 125 S. U. S.[4] | 1.0 | 0.10 |
|   Viscosity @ 210° F., 781 S. U. S.[5] | 1.0 | 0.09 |
| Tetradecanol | 1.0 | 0.09 |
| Glycerin | 1.0 | <0.01 |

[1] Of the type described with reference to Fig. 1.
[2] As determined by method described with reference to Fig. 1.
[3] Ucon LB 1145 lubricant.
[4] Ucon 50 HB 660 lubricant.
[5] Ucon 50 HB 5100 lubricant.

A salient feature of the invention therefore embraces the incorporation of such aliphatic organic hydroxy compounds into the organo-boron compositions of the invention, either alone or in conjunction with lubricating oil, fuels and the like, to impart greater hydrolytic stability thereto. The preferred relative concentration of the organic carbinol compounds to the organo-boron compositions of the invention is from about 1.0% to about 5.0% by volume thereof. Preferred organo-boron compositions include the polyalkylene glycols including the polyethylene glycols and the polypropylene glycols, especially the polyalkylene glycols and derivatives useful in synthetic lubricants and having viscosities at 210° F. within the range of from about 38 S. U. S. to about 800 S. U. S., glycerin, pentarythritol, mannitol, sorbitol, and like hexitols; monohydric paraffin alcohols, particularly those having from 5 to 20 carbon atoms, including amyl alcohol, hexanol, and the various isohexanols, heptanols, octanols, nonanols, decanols, dodecanols, tetradecanols, octadecanols, alcohols prepared by the methods described in this invention, and the like.

The organo-boron compositions of this invention of both the "crude" and "purified" type enjoy particular utility as additives to improve the oxidation characteristics of lubricating oils. Of particular significance is the fact that the organo-boron compositions of the invention, per se, demonstrate lubricating properties and in consequence thereof can be used in large relative proportions, up to about 100%, in lubricant blends. Preferably the organo-boron compositions of this invention are blended in a concentration of about 5% to about 30% by weight with conventional lubricants such as hydrocarbon oils or synthetic lubricants such as polypropylene glycols and polyesters.

It is within the purview of this invention to provide concentrates containing a lubricant and from about 30% to about 100% by weight of the organo-boron compositions of the invention which concentrates may be diluted to produce the ultimate commercial products.

Significantly, the "crude" organo-boron compositions of this invention demonstrate greater oxidation inhibition characteristics than do the "purified" organo-boron compositions of the invention, as evidenced by Table III appearing hereinafter.

It has been determined that the organo-boron compositions of this invention are surprisingly more effective as anti-oxidants when incorporated in lubricants containing a substantial proportion of aromatics, than they are when incorporated in lubricants which are more highly refined and which therefore are substantially free of aromatics. This result is indeed unexpected and remarkable. Refining trends and techniques in the industry in recent years have been directed toward removal of aromatics. Deposit-forming tendencies of mineral oils are directly related to the degree of refinement, for example, unextracted bright stock forms approximately two and one-half times as mush deposit as does 1100 grade aviation oil of the type previously described, in comparative steel strip tests. This relationship is reversed in the presence of the organo-boron compositions of the invention. The less highly refined mineral oil stocks containing the compositions of the invention form substantially less deposit in comparative steel strip tests than do more highly refined oils substantially free of aromatics containing a like relative quantity of the organo-boron compositions of the invention. Furthermore, the less highly refined oil containing the organo-boron products of the invention demonstrate markedly less increase in viscosity than do the more highly refined oils containing like amounts of the organo-boron compositions of the invention when the oil blends are subjected to conditions conducive of oxidation.

There is recorded in Table III data representative of the anti-oxidant effect, as evidenced by steel strip tests of both the "crude" and the "purified" organo-boron compositions of this invention when incorporated in the indicated oil stocks in a concentration of 5% to 15% by weight. The steel strip tests were carried out by maintaining a steel strip at a temperature of 600° F. in contact with a constant flow of the test oil for a period of six hours, at the end of which time the deposit formation in grams was ascertained by determining the quantity of deposit on the strip, and adding thereto the amount of pentane insoluble material in the tested oil. The rate of flow of the test oil over the steel strip was 320 grams per hour.

The utility of the organo-boron compositions of this invention as anti-oxidants is of course not limited to hydrocarbon oils of the type represented in Table III. The compositions of this invention are, in like manner, effective with synthetic oils such as polypropylene glycol compositions of the type disclosed in United States patents: 2,425,755, 2,425,845, 2,448,664, 2,457,139, 2,480,185, 2,481,278, and 2,492,955. The compositions are further useful as anti-oxidants in various other types of synthetic oil compositions including the polyester derivatives such as di-2-ethylhexyl sebacate.

It is within the purview of this invention to utilize the organo-boron compositions embraced thereby in conjunction with known additives for lubricants. These include such materials as sulfurized sperm oil, alkyl thiophosphates, magnesium alkyl sulfonates, and tricresyl phosphate. Such compositions are illustrated in Table IV. It will be appreciated, particularly with respect to the alkyl thiophosphate and tricresyl phosphate, that the effect obtained may be synergistic in nature and does not represent the mere additive effect of the compositions blended with the oil.

In Table IV are recorded the results of steel strip tests of No. 1100 grade aviation oil of the type previously described, blended with 15% by volume of "purified" organo-boron compositions of this invention and also blended with the additional additives as indicated. The steel strip tests and the "purified" organo-boron compositions utilized were the same as those described with respect to Table III.

The lubricants containing the organo-boron compositions of this invention may be prepared by methods well known to the art, such as by agitation of a mixture of the lubricant and additive; heating of a mixture of the lubricant and additive to effect solution; and other methods known to the art.

The organo-boron compositions of this invention are likewise of marked utility as additives for internal combustion engine fuels such as gasoline and diesel fuels. The compositions of the invention can be employed in such fuels in concentrations up to about 5%. Prefer-

TABLE III

| Quantity of Organo-Boron Composition in Oil (Wt. Percent) | Wt. of Deposit Formation (gms.) | | | |
|---|---|---|---|---|
| | 0 | 5 | 10 | 15 |
| 1100 Grade Aviation Oil [1] | 1.487 | | | |
| plus crude organo-boron compositions | | 0.439 | 0.236 | 0.220 |
| plus purified organo-boron compositions | | 0.716 | 0.628 | 0.435 |
| Extracted Motor Oil Stocks [2] plus purified organo-boron compositions | | | | 0.438 |
| Unextracted Motor Oil Stocks [3] plus purified organo-boron compositions | | | | 0.117 |
| Unextracted Bright Stock plus purified organo-boron compositions | | | 0.515 | 0.120 |
| 94.6% Unextracted Bright Stock and 5.4% Bright Stock Extract Blend [4] plus purified organo-boron compositions | 3.598 | | | 0.142 |
| 90% Raffinate Bright Stock [5] plus purified organo-boron compositions | | | | 0.440 |
| 74% Raffinate Bright Stock [6] plus purified organo-boron compositions | | | | 1.020 |

[1] Of the type described with reference to Figs. 1 and 2.
[2] Extracted motor oil stocks were prepared by phenol extraction of Pennsylvania neutral stocks and Pennsylvania bright stock; the latter prepared by propane treatment of Pennsylvania residual stocks. The neutral and bright stocks were characterized by the following properties:

| | | Neutral (95% Raffinate) | Bright Stock (90% Raffinate) |
|---|---|---|---|
| Vis. at 100° F | S. U. S. | 173.6 | 2100 |
| Vis. at 210° F | S. U. S. | 44.9 | 142 |
| V. I. | | 100.2 | 101 |
| Carbon Residue | | 0.05 | 0.6 |

[3] Unextracted motor oil stocks were composed of Pennsylvania neutral stocks and Pennsylvania bright stock having the following characteristics:

| | Neutral | Bright Stock |
|---|---|---|
| Vis. at 100° F | 192.0 | 2,444 |
| Vis. at 210° F | 45.8 | 151 |
| V. I. | 96.3 | 97.0 |
| Carbon Residue | 0.08 | 1.2 |

[4] Obtained by blending Pennsylvania bright stock with the phenol extract obtained from another sample of Pennsylvania bright stock. The bright stock utilized in both instances was the same as that described in footnote 3. The phenol extract bright stock was characterized by the following physical properties:

*Bright stock extract*
Vis. at 100° F _____ about 900,000 S. U. S.
Vis. at 210° F _____ 981 S. U. S.
V. I. _____ about −300
Carbon residue _____ 9.10

[5] Obtained by phenol extraction of Pennsylvania bright stock to a 90% raffinate yield. The bright stock was the same as that described in footnote 2.

[6] Obtained by phenol extraction of Pennsylvania bright stock to a 74% raffinate yield, and having the following physical properties:

Vis. at 100° F _____ 1,792.7 S. U. S.
Vis. at 210° F _____ 137.0 S. U. S.
V. I. _____ 105.9
Carbon residue _____ 0.34

TABLE IV

| Additive | Vol. Percent | Deposit on Steel Strip (gms.) |
|---|---|---|
| None | 0.00 | 0.435 |
| Sulfurized Sperm Oil (Carlisle 100–X) | 1.50 | 0.560 |
| Alkyl thiophosphate:[1] | | |
| (Santolube 365) | 0.75 | 0.14 |
| (Santolube 365) | 0.50 | 0.10 |
| Tricresyl Phosphate | 5.00 | 0.60 |
| Magnesium Petroleum Sulfonate | 2.00 | 0.12 |

[1] A commercial thiophosphate anti-oxidant containing 5.8% phosphorus and 9.2% sulfur.

ably the organo-boron compositions are utilized in concentrations up to about 1.0%, based on the total weight of the fuel. A highly suitable concentration range is from about 0.05% to about 1% based on the weight of the fuel. Specific examples of such fuels include: a conventional straight run gasoline derived from Pennsylvania crude oil having a boiling point range of about 100° F. to about 320° F., containing about 0.5% by weight of the "crude" organo-boron compositions of the type produced by Example 1; a diesel fuel derived from Pennsylvania crude oil having a boiling point within the range of about 340° F. to about 625° F., containing about 1.0% of the "purified" organo-boron compositions of the type described in Example 1; a gasoline derived from California crude oil having a boiling point range of from about 100° F. to about 400° F. and containing about 0.75% by weight of the "crude" organo-boron compositions of the type described in Example 2; gasoline of the above boiling ranges derived by catalytically cracking, thermal cracking, catalytic reforming from the above crude sources, or other crude sources, combined with the above organo-boron compositions; high sulfur fuel oils such as those derived from West Texas and other crude sources; other fuel oils derived from "cycle" stocks.

The fuels within the purview of this invention may be obtained by blending the organo-boron compositions of the invention with the particular fuel in a conventional manner by methods well known to those skilled in the art. It is within the purview of this invention to prepare blends embodying gasoline, diesel fuels and the like, containing from about 20% to about 100%, and preferably from 30% to about 90% of the organo-boron compositions of the invention, which concentrates may be diluted to produce an ultimate commercial product containing organo-boron compositions within the previously defined ranges.

It has been determined that fuels containing the organo-boron compositions of this invention demonstrate substantially less tendency to form deposits in internal combustion engine combustion chambers, and likewise is attended by less pre-ignition, particularly in high compression engines.

EXAMPLE 1

Approximately 1978.8 grams of paraffinic petroleum fraction, substantially free of aromatics and having an average molecular weight of about 235, a flash point of 275° F., a viscosity at 100° F. of 39.6 S. U. S., a viscosity at 210° F. of 31.0 S. U. S., a cloud point of 28° F., an actual pour point of 25° F., and a distillation range of from 523° F. to 642° F., with an end-point of 703° F., a density at 20° C. of 0.8014, and a refractive index of 1.4456, was placed in a reaction vessel and mixed with a synthetically compounded mixture containing about 75% by weight of boric anhydide ($B_2O_3$) and about 25% by weight or ortho-boric acid ($H_3BO_3$) in an amount requisite to provide to the ultimate reaction about 2.0 equivalents of ortho-boric acid per mole of hydrocarbon starting material. The mixture was heated in the reaction vessel to a temperature of about 355° F. whereupon air was passsed through the reaction mixture at a rate of about 2.25 cubic feet per hour per gallon of paraffinic starting material for a period of about six hours. There was obtained a crude reaction product containing about 0.3% of chemically combined boron.

This crude reaction product was distilled at 3 mm. pressure to a maximum temperature of about 166° C. and there was obtained a 21.2% yield based on the paraffinic starting material of a crude organo-boron product having an average molecular weight of about 587, a viscosity at 210° F. of about 74.7 S. U. S. and an acid number of about 37.0. The product so obtained was subjected to hydrolysis and sedimentation tests of the type hereinbefore described. No appreciable sedimentation was observed. About 0.25 weight percent of solids resulting from hydrolysis were precipitated. Additives forming about 0.3% by weight or less of hydrolysis solids, under conditions of test as described above, are acceptable as lubricant additives. About 3.0% by volume is the upper limit of sedimentation solids which may be tolerated.

The product may be converted into a "purified" organo-boron composition by hydrolyzing with alkali and distilling the hydrolyzed product and re-esterifying the so obtained alcohols with ortho-boric acid or boric anhydride.

A blend of about 0.75% by weight of the "crude" product or the "purified" product of this example, with 99.25% by weight of gasoline, constitutes an excellent motor fuel which demonstrates reduced pre-ignition and deposit forming tendencies when utilized in an automobile engine.

EXAMPLE 2

Example 1 was repeated with the exception that there was employed at the initiation of the reaction a synthetically compounded mixture containing about 90% by weight of boric anhydride ($B_2O_3$) and about 10% by weight of ortho-boric acid ($H_3BO_3$).

"Crude" organo-boron compositions obtained from the reaction mixture so produced, were analogous to those obtained in Example 1 and demonstrated no sedimentation when blended with No. 1100 grade aviation oil. Precipitation of 0.12% by weight of solids by hydrolysis from the oil blend was observed. A blend of about 1.0% of the "crude" organo-boron composition of this example with about 99% of the diesel fuel derived from Pennsylvania crude oil and having a boiling point range of about 340° F. to about 625° F. is a superior product.

EXAMPLE 3

Example 1 was repeated with the exception that USP boric acid ($H_3BO_3$) was substituted for the boric acid-boric anhydride mixture employed in Example 1. A product analogous to that in Example 1 was obtained. The boric acid is disadvantageous as a starting material for the reason that it becomes sticky under the reaction conditions.

EXAMPLE 4

Example 1 was repeated with the exception that the process was carried out at a temperature of about 385° F. for a period of about five hours, and boric anhydride was substituted for the boric acid-boric anhydride mixture employed in Example 1.

A product analogous to that resulting from Example 1 was obtained. The "crude" organo-boron composition was obtained by distilling the reaction mixture at about 5 mm. pressure to a maximum temperature of about 175° C. and was characterized by a molecular weight of 624, a viscosity at 210° F. of 96.1 S. U. S. and an acid number of 56.0. When subjected to sedimentation and hydrolysis tests in lubricating blends in the manner hereinbefore described, the product formed 1.1% by volume of the oil blend of sedimentation and 0.11% by weight of hydrolysis products. Approximately 0.5% of the "crude" organo-boron composition of this invention when blended with about 99.5% by weight of a gasoline containing about 3 milliliters per gallon of tetraethyl lead, forms a superior automobile engine fuel.

EXAMPLE 5

The process of Example 4 was repeated with the exception that the process was carried out at a temperature of about 305° F. for a period of about six and one-half hours.

The "crude" organo-boron composition which was obtained by distilling the reaction mixture at a pressure of 4 mm. to a maximum temperature of 171° C. was characterized by a molecular weight of 579, a viscosity at 210° F. of 91.5 S. U. S. and an acid number of 48.1.

When subjected to the aforementioned tests for hydrolysis and sedimentation in lubricant oil blends, the product formed 1.0% by volume of solids by sedimentation and 0.08% by weight of solids by hydrolysis.

EXAMPLE 6

The process of Example 4 was repeated with the exception that the process was carried out at a temperature of 325° F. for a period of about seven hours. The "crude" product obtained by distilling the reaction mixture at a pressure of 5 mm. to a maximum temperature of about 175° C. was characterized by a molecular weight of 530, a viscosity at 210° F. of 89.4 S. U. S. and an acid number of 58.5. In the previously described sedimentation and hydrolysis tests in blends with lubricating oils, the product of this example formed 1.5% by volume of solids by sedimentation, and 0.16% by weight of solids by hydrolysis.

EXAMPLE 7

The process of Example 1 was repeated with the exception that there was employed in the reaction mixture boric anhydride in an amount requisite to supply 1 equivalent of ortho- or meta-boric acid per mole of paraffinic hydrocarbon starting material, and the process was carried out for a period of about six hours.

The crude product obtained by distilling the reaction mixture at a pressure of 3 mm. to a maximum temperature of 165° C. was characterized by a molecular weight of about 612, a viscosity at 210° F. of 90.9 S. U. S. and an acid number of 54.0. This product, when blended with lubricating oils and subjected to sedimentation tests of the aforementioned type, formed about 0.7% by weight of solids by sedimentation.

EXAMPLE 8

The process of Example 7 was repeated with the exception that the process was carried out for about fifteen hours, at 355° F., thus approaching conditions of exhaustive oxidation. The resulting product obtained by distilling the reaction mixture at a pressure of 3 mm. to a maximum temperature of 164° C. when blended with lubricants in the same manner as the product from Example 7, formed 12.5% by volume of solids by sedimentation, thus demonstrating the necessity to avoid exhaustive oxidation of the reaction mixture.

EXAMPLE 9

The process of Example 7 was repeated with the exception that the reaction was carried to exhaustive oxidation by maintaining the flow of air through the reaction mixture for a period of about 11 hours. The resulting product obtained by distilling the reaction mixture at a maximum temperature of 163° C. at a pressure of 3 mm., when blended with aviation oil formed 10.5% by volume of solids by sedimentation and 0.46% by volume of solids by hydrolysis, thus demonstrating the criticality of avoiding exhaustive oxidation of the reaction mixtures of this invention.

EXAMPLE 10

The process of Example 7 was repeated with the exception that there was utilized ortho-boric acid in an amount requisite to provide 6 equivalents thereof per mole of paraffinic hydrocarbon present in the starting material, and the process was carried out for about two and one-half hours. The product obtained by distilling the reaction mixture at a pressure of 5 mm. to a maximum temperature of 175° C. formed 0.65% by weight of solids by hydrolysis when blended with lubricating oils in the manner hereinbefore described.

EXAMPLE 11

The process of Example 7 was repeated with the exception that air was supplied to the reaction mixture at a rate of about 1.06 cubic feet per hour per gallon of paraffinic starting material. The crude product obtained by distilling the reaction mixture at a pressure of 3 mm. to a maximum temperature of 166° C. was characterized by a molecular weight of 453, a viscosity of 210° F. of 53.2 S. U. S. and an acid number of 27.5.

This product, when subjected to hydrolysis and sedimentation tests in lubricating oil blends of the aforementioned types, formed no appreciable sedimentation and only about 0.20% by weight of solids by hydrolysis.

EXAMPLE 12

The process of Example 7 was repeated with the exception that in this instance there was employed the boric acid-boric anhydride mixture resulting from a previous oxidation reaction carried out in accordance with the method of the invention. The boric acid-boric anhydride mixture employed was washed with acetone prior to utilization in the experiment described in this example.

The product obtained by distilling the resulting reaction mixture at a pressure of 2 mm. to a maximum temperature of 161° C. was characterized by a molecular weight of 522, a viscosity at 210° F. of 66.9 S. U. S. and an acid number of 33.0.

This product, when blended with lubricating oils and tested in the manner previously described, formed no sedimentation and about 0.26% by weight of the oil blend of solids by hydrolysis.

EXAMPLE 13

The process of Example 7 was repeated with the exception that an air rate of about 3.33 cubic feet per hour per gallon of paraffinic petroleum fraction starting material was utilized, and the process was continued for a period of about five hours.

A crude organo-boron product was obtained by distilling the reaction mixture to an ultimate temperature of 161° C. at 2 mm. pressure. The crude composition was characterized by an acid number of 65, a viscosity at 210° F. of 88.2 S. U. S., and formed about 0.23% solids by hydrolysis when subjected to the aforementioned hydrolysis tests in oil blends.

EXAMPLE 14

The process of Example 7 was repeated with the exception that air was passed through the reaction mixture at a rate of about 4.5 cubic feet per hour per gallon of paraffinic petroleum fraction. The "crude" organo-boron composition obtained from the reaction mixture by distillation to a maximum temperature of 165° C., at 3 mm. pressure was characterized by an acid number of 71.7, and a viscosity at 210° F. of 166.8 S. U. S.

This "crude" product formed 10.5% by volume of solids by sedimentation and 0.35% by weight of solids by hydrolysis, when subjected to the previously described tests in oil blends. This example demonstrates the inoperability of air rates substantially exceeding the upper limit hereinbefore described for the process of this invention.

EXAMPLE 15

42 gallons of a paraffinic petroleum fraction, having an approximate molecular weight of 175, a flash point of 180° F., a viscosity at 100° F. of 31.5 S. U. S., a viscosity at 210° F. of 28.5 S. U. S., showing a kattwinkle loss of 0.0%, was mixed with 5,170 grams of boric anhydride and 160 grams of manganese naphthenate, containing about 6% by weight of manganese. Air was passed through this reaction mixture at a rate of about 3.0 cubic feet per hour per gallon of petroleum fraction, for a period of about four hours. The "purified" organo-boron composition obtained therefrom was useful as an oil additive.

EXAMPLE 16

42 gallons of a petroleum fraction having an average molecular weight of 150, a viscosity at 100° F. of 1.169 centistokes, a boiling range of 367° F. to 439° F., and showing a kattwinkle loss of zero, were blended with about 30 pounds of boric anhydride and 0.25 pound of manganese naphthenate of the type described in Example 15. Air was passed through this mixture at a rate of about 3.0 standard cubic feet per hour per gallon of hydrocarbon, for a period of about seven hours. The reaction temperature was maintained at 310° F. and the pressure in the reaction vessel at 25 pounds per square inch guage. The reaction mixture was distilled to remove the lighter fractions and the residue thereby obtained was recovered as the product. This product was hydrolyzed with boiling water. The alcohols released by hydrolysis were removed by distillation. A yield of 12 weight percent of the charge was obtained in the form of alcohols having 10 to 11 carbon atoms per molecule. The unreacted hydrocarbon recovered from the first distillation step may be again utilized in the production of organo-boron compositions.

Alcohols may be obtained from any of the reaction products described in the examples of this application in like manner. Aqueous caustic, particularly aqueous sodium hydroxide, may be availed of in lieu of boiling water to effect hydrolysis of the resulting products.

EXAMPLE 17

2113.2 grams of a petroleum fraction having an average molecular weight of 352, a flash point of 400° F., a viscosity at 100° F. of 103.2 S. U. S., a viscosity at 210° F. of 39.6 S. U. S., a cloud point of +4° F., showing a kattwinkle loss of 5.5%, were admixed with 69.7 grams of boric anhydride and 2.1 grams of manganese naphthenate of the type described in Example 15. Air was passed through this mixture at a rate of about 2.25 cubic feet per hour per gallon of petroleum fraction, for a period of about seven and one-half hours. By distillation, there may be obtained from the reaction mixture so produced, a "crude" organo-boron composition useful as a lubricant or fuel additive.

We claim:

1. A process for preparing organo-boron compositions which consists essentially of passing a free-oxygen containing gas through a normally liquid paraffinic petroleum fraction having a boiling point in the range of about 350° F. to about 800° F., maintained at a temperature within the range of about 305° F. to about 385° F.; there being available for reaction in said fraction from about 1 to about 3 chemical equivalents of an acid, selected from the group consisting of ortho-boric acid and meta-boric acid, per mole of paraffinic hydrocarbon; said gas being passed through said fraction at a rate requisite to provide not more than about 0.6 cubic feet of oxygen per hour per gallon of said fraction; to produce a crude reaction product containing at least about 0.2% by weight of chemically combined boron.

2. The process of claim 1, wherein the free-oxygen containing gas is passed through the normally liquid paraffinic petroleum fraction at a rate requisite to provide from about 0.3 cubic feet to about 0.5 cubic feet of oxygen per hour per gallon of said fraction.

3. The process of claim 1 wherein the free-oxygen containing gas is air.

4. The process of claim 3, wherein air is passed through the normally liquid paraffinic petroleum fraction at a rate requisite to provide from about 1.5 to about 2.5 cubic feet of air per hour per gallon of said fraction.

5. The process of claim 1, wherein there is utilized as a source of acid selected from the group consisting of ortho-boric acid and meta-boric acid, a mixture containing from about 50% to about 90% by weight of boric anhydride, and from about 50% to about 10% by weight of an acid selected from the group consisting of ortho-boric acid and meta-boric acid.

6. The process of claim 5, wherein the mixture of boric anhydride and an acid selected from the group consisting of ortho-boric acid and meta-boric acid, consists essentially of the boric acid and residue obtained from a previous oxidation reaction carried out in accordance with the method of claim 1.

7. The process of claim 1 carried out at a temperature of from about 340° F. to about 365° F.

8. The process of claim 1 in which the free-oxygen containing gas is preheated to a temperature of from about 160° F. to about 210° F. prior to utilization in the process of the invention.

9. The process of claim 1 carried out in a cylindrical vessel in which the ratio of the depth of the liquid reaction mixture to the area of the cross-section of the cylinder is at least about 2.

10. The process of claim 1 carried out in the presence of an oxidation catalyst.

11. The process of claim 10, wherein the oxidation catalyst is selected from the group consisting of manganese naphthenate, manganese stearate, copper naphthenate, cobalt napthenate, and nickel napthenate.

12. The process of claim 1, wherein the starting material is a normally liquid, mineral-oil soluble, paraffin having a boiling point within the range of from about 500° F. to about 600° F.

13. The process of claim 1, wherein the normally liquid paraffinic petroleum fraction utilized has an overall boiling point range not more than about 100° F.

14. The process of claim 1, in which a basic inorganic material, a saturated solution of which at about 75° F., is characterized by a pH of between about 7.0 and about 10.0, is included in the reaction mixture in a quantity of from about 0.5% to about 5.0% by weight, based on the quantity of paraffinic petroleum fraction utilized.

15. The process of claim 14, wherein the inorganic basic material is selected from the group consisting of the alkaline metal borates, the alkaline earth metal borates, and aluminum hydroxide.

16. The boric acid ester containing compositions produced according to the process of claim 1.

17. The boric acid ester containing compositions produced according to the method of claim 15.

18. Boric acid ester containing compositions obtained by distilling the crude reaction mixture produced by the method of claim 1.

19. The boric acid ester containing compositions produced according to the method of claim 1, having incorporated therein organic carbinol compounds in an amount sufficient to impart hydrolytic stability thereto.

20. The boric acid ester containing compositions of claim 19, in which the organic carbinol compound is selected from the group consisting of the polyethylene glycols, the polypropylene glycols, glycerin, pentaerythritol, mannitol, sorbitol, and the monohydric paraffin alcohols, having from 5 to 20 carbon atoms.

References Cited in the file of this patent

UNITED STATES PATENTS

| Number | Name | Date |
|---|---|---|
| 1,947,989 | Hellthaler | Feb. 20, 1934 |
| 2,053,474 | Graves | Sept. 8, 1936 |
| 2,160,917 | Shoemaker et al. | June 6, 1939 |
| 2,312,208 | Clayton et al. | Feb. 23, 1943 |
| 2,462,616 | Eby et al. | Feb. 22, 1949 |
| 2,526,506 | Rogers et al. | Oct. 17, 1950 |

OTHER REFERENCES

J. A. C. S., vol. 67, December 1945, pages 2150–52. (Copy in 260–462.)